March 14, 1967  J. J. FRANKLIN ETAL  3,308,556
MATERIAL TREATING APPARATUS

Filed Oct. 19, 1964

INVENTORS:
JOHN J. FRANKLIN
JOHN R. THYGESON, SR.
BY
Howson & Howson
ATTYS.

March 14, 1967     J. J. FRANKLIN ETAL     3,308,556
MATERIAL TREATING APPARATUS
Filed Oct. 19, 1964     5 Sheets-Sheet 2
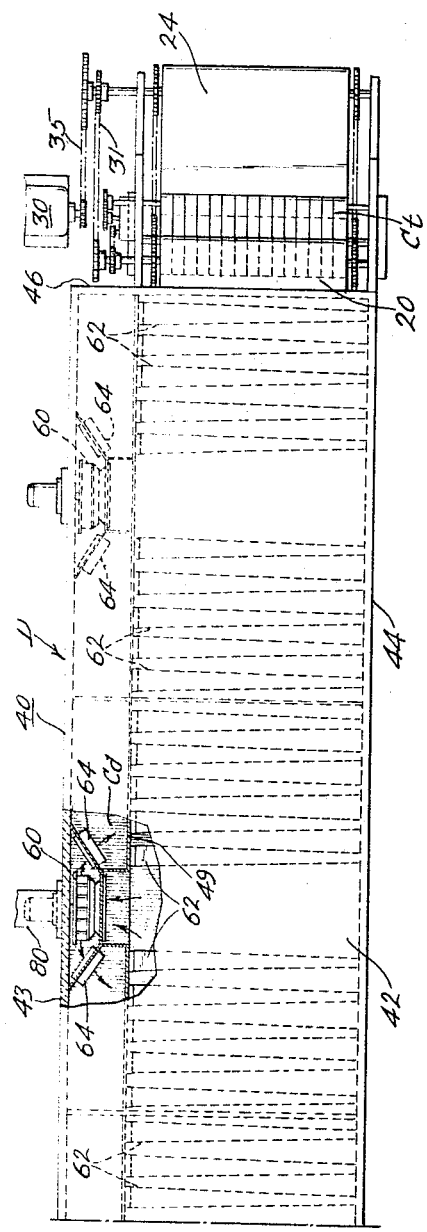
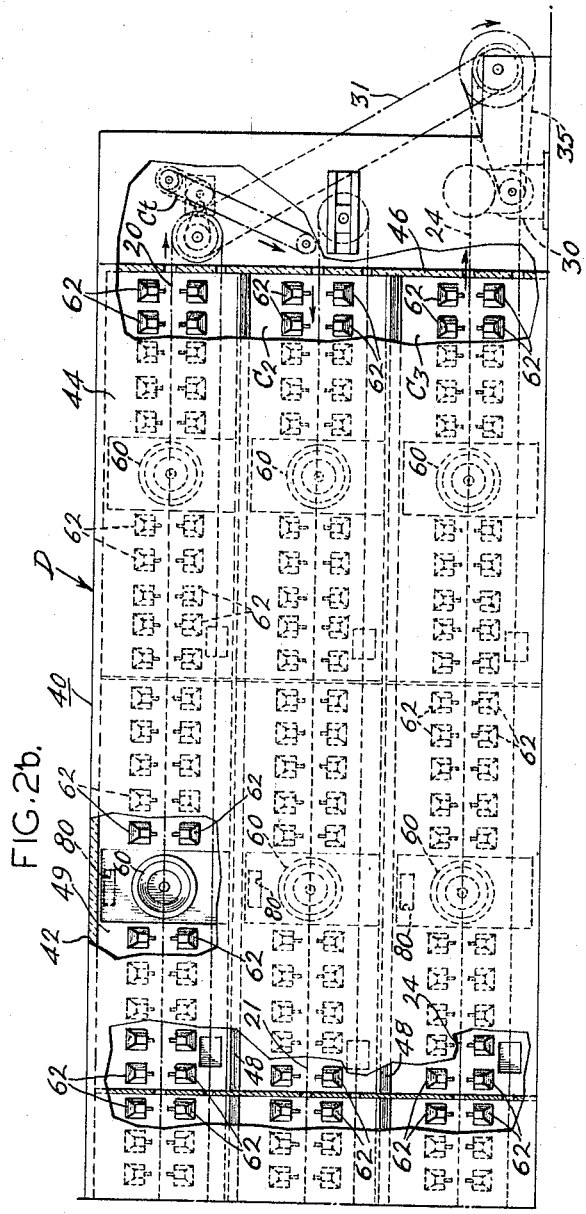
INVENTORS;
JOHN J. FRANKLIN
JOHN R. THYGESON, SR.
BY Howson & Howson
ATTYS.

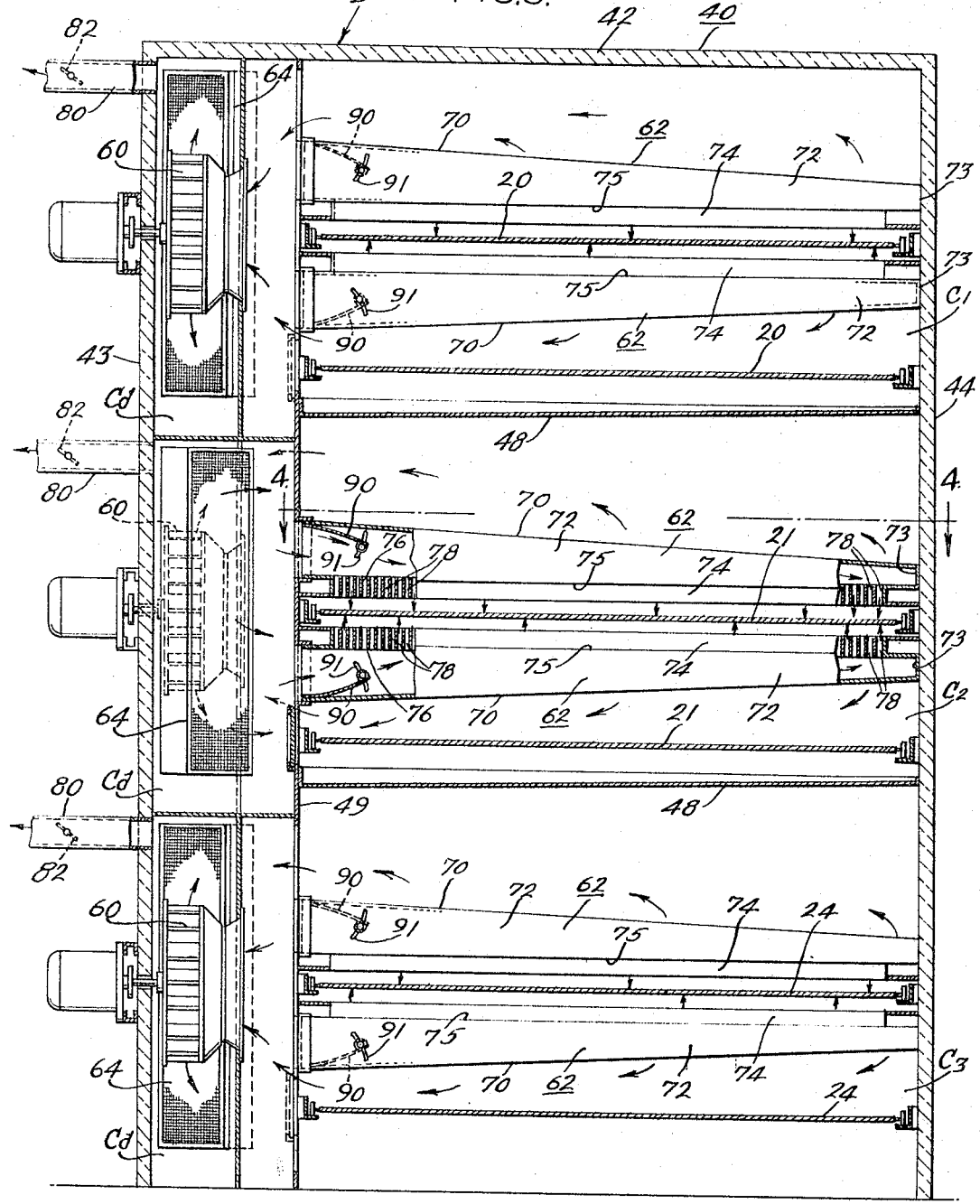

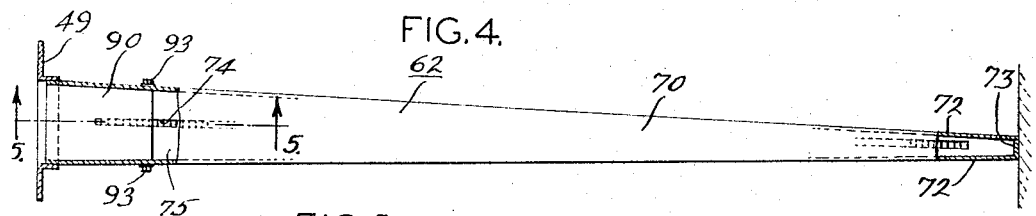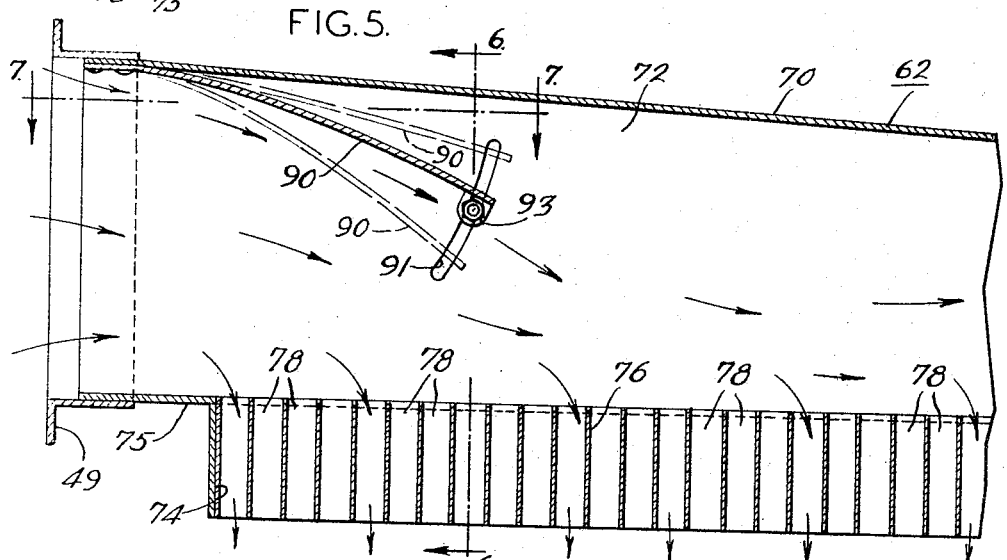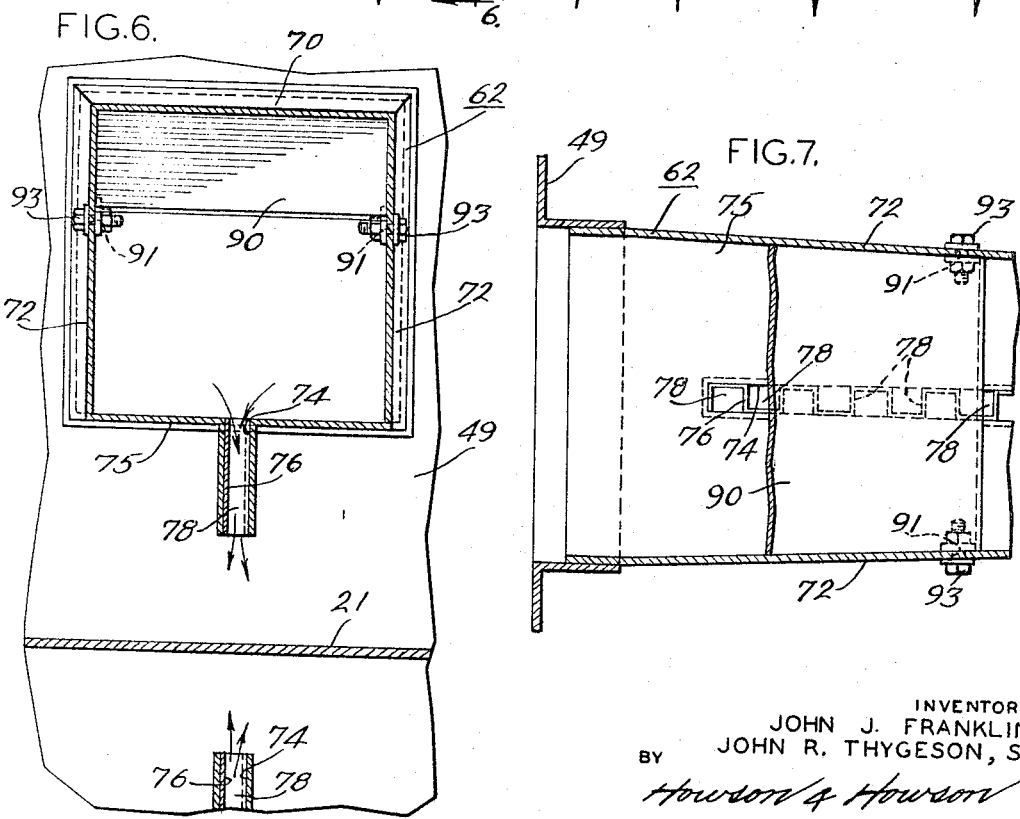

March 14, 1967 J. J. FRANKLIN ET AL 3,308,556
MATERIAL TREATING APPARATUS
Filed Oct. 19, 1964 5 Sheets-Sheet 5

INVENTORS:
JOHN J. FRANKLIN
JOHN R. THYGESON, SR.
BY Howson & Howson
ATTYS.

United States Patent Office

3,308,556
Patented Mar. 14, 1967

3,308,556
MATERIAL TREATING APPARATUS
John J. Franklin, Glenside, and John R. Thygeson, Sr., Fox Chase Manor, Pa., assignors to Proctor & Schwartz, Inc., Philadelphia, Pa., a corporation of Pennsylvania
Filed Oct. 19, 1964, Ser. No. 404,871
7 Claims. (Cl. 34—207)

This invention relates to material treating apparatus. More particularly the invention relates to apparatus for drying various types of materials such as homogenized sheet tobacco, plastic sheet material, coated fabrics, paper and others.

In the process of making, for example, homogenized sheet tobacco, ground tobacco particles are mixed with a binder to form a mixture which thereafter is deposited in thin layers on a conveyor for drying or curing in a dryer. The cured sheets are used, for example, as cigar wrappers. These drying apparatus generally comprise an elongated, generally enclosed housing, which may be of the type illustrated in the drawings, having several compartments and conveyor means for conveying the sheet tobacco through the various compartments of the dryer. During the course of movement through the dryer, the sheet material is dried by circulating a heated treating medium through the dryer. These dryers usually comprise a plurality of air boxes having a plurality of discharge nozzles along one side which extend transversely to the direction of movement of the sheet material through the dryer. These air boxes, which are open at one end, may be supplied with air at a given velocity by conventional circulating means such as a fan.

It has been found, however, that one of the problems with this method of circulating the treating medium in the housing is that the air entering the open end of the air box creates a vacuum or suction at the entrance end so that the velocity and volume of treating medium discharged through the discharge nozzles of the box are not uniform across the width of the conveyor. This being the case, it is clear that the processed material on the conveyor is not subjected to the same treating conditions, and accordingly, it is very difficult to control the final condition of the material being processed.

In the drying of homogenized sheet tobacco, as well as in drying other sheet material, it is desirable that all of the material being treated be dried to a predetermined, uniform condition. The final condition of homogenized sheet tobacco is important for the reason that if the sheets are not of a predetermined color, they are not suitable and if they are too brittle, they cannot be used. Moreover, since the dryer is run at a speed sufficient to cure the slowest material, it may be seen that the drying operation efficiency is retarded by non-uniform drying conditions.

The present invention provides a solution to this problem which in the present instance, comprises the use of a curved deflector plate in the entrance end of the air box which serves to break up the turbulence as it enters the box and insure a predetermined uniform velocity of the air discharged through all of the discharge nozzles. The deflector plate is selectively adjustable so that the curvature may be selectively varied relative to the velocity of the incoming air. Accordingly, by having uniform discharge through all of the nozzles, all of the material treated in the dryer is subjected to the same treating conditions and hence, the final condition of all the material processed is uniform. Moreover the drying time is minimized and hence, the efficiency of the drying operation is high.

With the foregoing in mind, an object of the present invention is to provide apparatus for treating material wherein means is provided for insuring uniform treating conditions for all of the material so that the final condition of the processed material is uniform and may be controlled accurately.

Another object of the present invention is to provide apparatus for achieving uniform treatment of material which is of comparatively simplified construction and may be manufactured easily and economically.

These and other objects of the present invention and the various features and details of the operation and construction of the apparatus are hereinafter more fully set forth with reference to the accompanying drawings, in which:

FIGS. 1a and 1b are plan views with parts broken away of material treating apparatus embodying the present invention;

FIGS. 2a and 2b are side elevational views with parts broken away of apparatus shown in FIGS. 1a and 1b;

FIG. 3 is an enlarged sectional view taken on lines 3—3 of FIG. 2a, again with parts broken away to show the internal construction of the air boxes;

FIG. 4 is a fragmentary plan view taken on line 4—4 of FIG. 3, with parts broken away of one of the air boxes;

FIG. 5 is an enlarged sectional view taken on lines 5—5 of FIG. 4;

Figure 8:
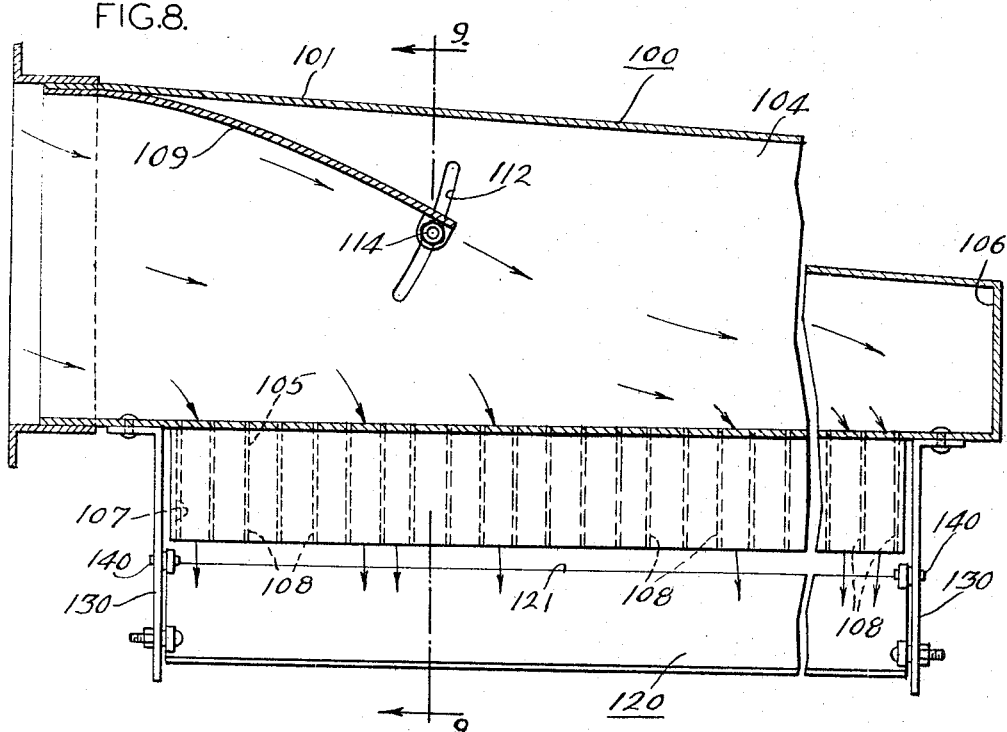
Figure 9:
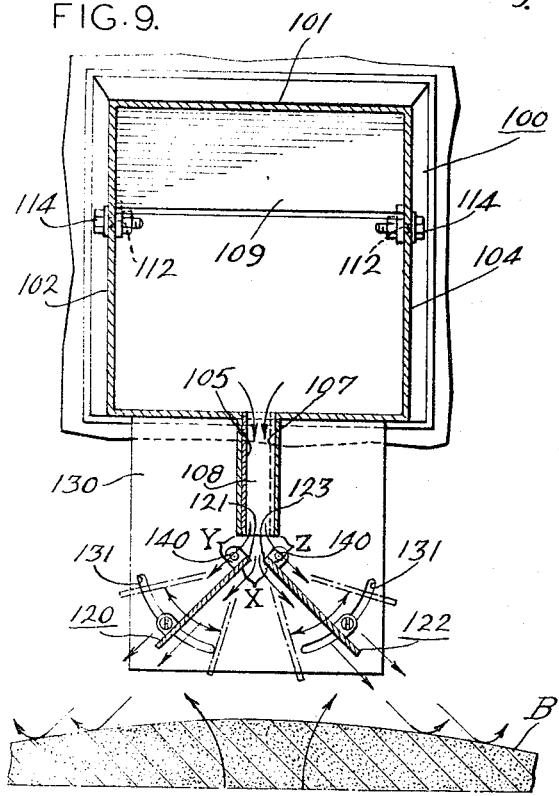

FIGS. 6 and 7 are enlarged sectional views taken on lines 6—6 and 7—7 of FIG. 5;

FIG. 8 is a fragmentary sectional view of another embodiment of air box embodying the present invention; and FIG. 9 is an enlarged sectional view taken on lines 9—9 of FIG. 8.

Referring now to the drawings, there is shown in FIGS. 1a, 1b, 2a, and 2b material treating apparatus embodying the present invention. Considering the primary components of the apparatus in terms of function, material to be treated, for example, a mixture of ground tobacco particles and a binder to form homogenized sheet tobacco, is deposited in thin layers on a first conveyor 20 which delivers the material through the first compartment $C_1$ of a series of drying compartments in the dryer.

The conveyor 20 is suitably actuated by a motor 30 and belt transmission 31 for movement in an endless path to transport the sheet material through the uppermost compartment $C_1$ of the dryer D. The sheet material is transferred to a second endless conveyor 21 for movement of the material through the middle compartment $C_2$ of the dryer by means of a transfer conveyor $C_t$ at the discharge end of the dryer. The conveyor 21 is suitably actuated by a motor 32 and belt transmission 33 for movement in an endless path to transport the sheet material back through the middle compartment of the dryer. At the entrance end of the dryer, a deflector 36 is provided to transfer the sheet material to an endless conveyor 24 in the lowermost compartment $C_3$ of the dryer. This lowermost conveyor 24 is also actuated by the motor 30 through another transmission 35. The processed sheet material then leaves the delivery end of the dryer for further processing. During movement of the material through the dryer D, a treating medium, for example, a heated drying medium, is circulated through the compartments of the dryer to effect in the present instance, curing of the homogenized sheet tobacco.

Even though the dryer of the present invention is described in connection with curing of homogenized sheet tobacco, it is, of course, to be understood that it has useful applications for treating other types of materials, for example, plastic sheet material, coated fabrics, paper, batts of fibers and others.

Figure 1A:
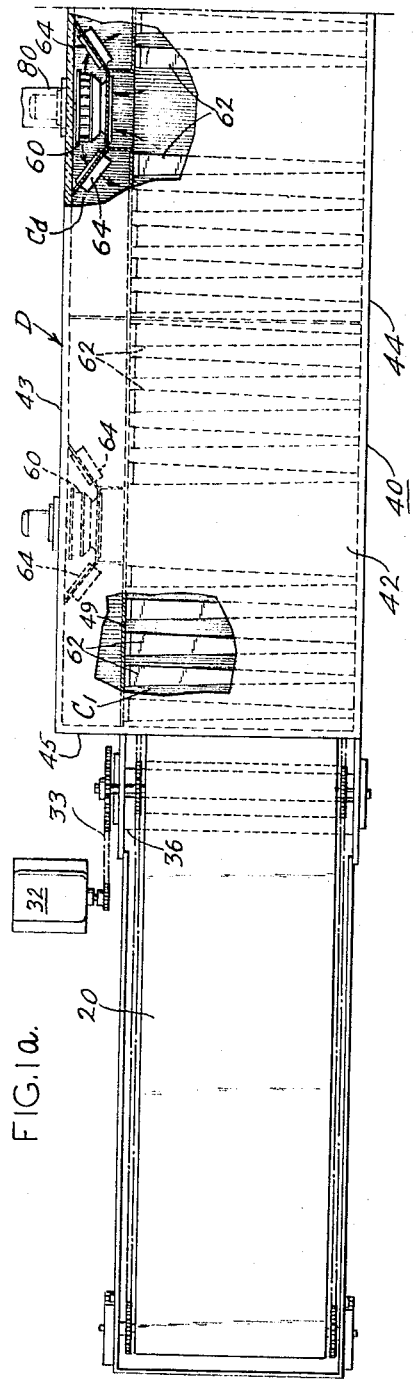
Figure 2A:
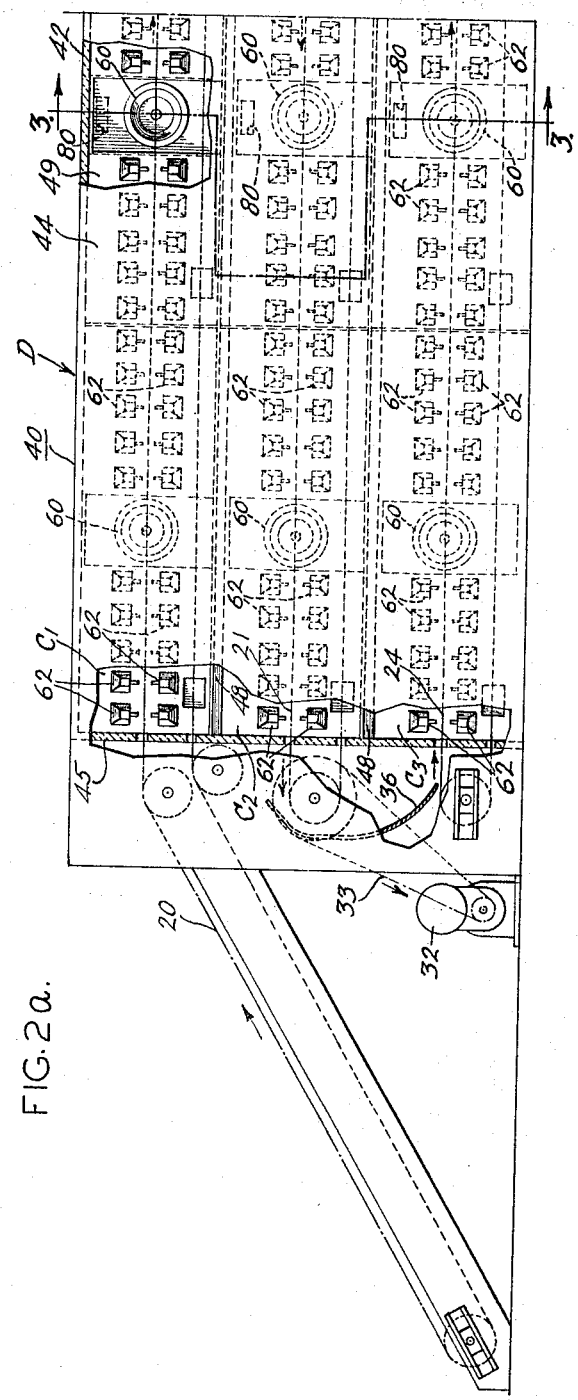

Considering now the structural details of the dryer and with particular reference to FIGS. 2a and 2b, the dryer D comprises an elongated, generally enclosed housing 40, including a top wall 42, opposing side walls 43 and 44, and front and end walls 45 and 46. The dryer housing 40 further includes a pair of spaced horizontally extending partitions 48 dividing the housing transversely into the three drying compartments $C_1$, $C_2$, and $C_3$. As best illustrated in FIGS. 1a and 1b, the housing 40 is further divided by vertical partition 49 spaced from one of the side walls defining conditioning chambers $C_d$ for the compartments $C_1$, $C_2$, and $C_3$, which chambers $C_d$ run the length of the housing. Suitable openings are provided in the front and rear wall of the housing to facilitate the conveyors and also passage of the material to be dried into and out of the dryer housing.

In the present instance, means is provided for circulating a treating medium in each of the drying compartments of the dryer. This circulating means includes a series of spaced motor operated fans 60 in the conditioning chambers and a series of air distribution boxes 62 arranged on opposite sides of the upper run of each of the conveyors in the various compartments of the dryer as best illustrated in FIG. 3. Each fan 60 has, in the present instance, a heater 64 disposed on opposite sides thereof. Suitable openings are provided in the vertical partition 49 to effect the desired circulation of the drying medium between the drying compartments and the conditioning chambers. More specifically with respect to FIG. 3, it may be seen that air is drawn into the suction side of the fan and discharged by the impeller over the heaters 64 and then through the entrance openings in various air distribution boxes 62. The treating medium is directed through discharge nozzles of the boxes on either side of the upper run of each of the conveyors and then, as indicated by the arrows in FIG. 3, returns and is drawn into the suction side of the fan to be recirculated. Suitable discharge ducts 80 having dampers 82 therein may be provided in the side wall of the housing communicating with the conditioning chamber for selectively controlling the amount of air withdrawn from the dryer.

In accordance with the present invention, means is provided for effecting uniform distribution of the drying medium directed against the material on the conveyor across the entire width thereof. To this end, each of the air distribution boxes 62 comprises a top wall 70 and opposing side walls 72 all of which converge toward the closed end 73 of the box. In the bottom wall 75 of each box, which is as illustrated, disposed parallel to the conveyor, there is provided an elongated, generally rectangular outlet port 74 which extends approximately the width of the conveyor and which has mounted therein a depending honeycomb 76 dividing the outlet port into a series of generally square discharge nozzle opening 78. Accordingly, by this arrangement, the drying medium which enters the entrance end of the box is discharged through the discharge nozzles 78 downwardly against the face of the conveyor.

In accordance with the present invention, a curved deflector plate 90 is provided in the entrance end of the air box 62, which plate 90 as illustrated best in FIG. 5, is secured to the top wall of the box 62 and curves downwardly therefrom toward the closed end of the box. By this arrangement, the movement of air into the box is controlled in such a manner that the air discharged through all of the discharge nozzles 78 is uniform. By means of this deflector plate, the creation of a low pressure area at the entrance end of the air box, which tended to reduce the velocity of the air discharged through the discharge nozzles 78 adjacent the entrance end of the box, is eliminated. The curvature of the deflector 90 is preferably adjustable so that its position may be selectively varied. To this end, in the present instance, a pair of confronting, arcuate openings 91 are provided in the opposed side walls of the air box 62 and the end of the deflector 90 has fastening means 93 which engage through the openings 91 so that the position of the deflector 90 in the box may be selectively varied between the broken line positions shown in FIG. 5.

There is shown in FIGS 8 and 9 another embodiment of air box 100 embodying the air flow control means in accordance with the present invention. The general configuration of the box is substantially the same as that described above. The air box has a top wall 101 and opposing side walls 102 and 104, all of which converge toward the closed end of the box as at 106. The bottom wall has an elongated, generally rectangular outlet port 107 and a honeycomb 105 depending from the outlet port to define a plurality of side by side discharge nozzles 108.

As in the previously described embodiment of air box in accordance with the present invention, there is provided a curved deflector plate 109 disposed in the entrance end of the air box which serves to insure uniform a discharge velocity of air through all of the discharge nozzles 108. Arcuate openings 112 are provided in the opposed side walls of the box to receive screw fastening means 114 whereby the curvature of the deflector plate 109 and the position thereof may be selectively varied. This arrangement provides a means for adjusting the curvature of the deflector plate in relation to the incoming velocity of the air, thereby to effect a uniform discharge velocity through the outlet ports regardless of what the incoming velocity of the air to the air box is. In the present instance, the air box additionally includes baffle means exteriorly of the discharge nozzles in the path of flow of the treating medium. By this baffle arrangement, the air discharged through the nozzles is diffused or broken up so that the full thrust of the treating medium is not directly onto the surface of the material being processed. This arrangement is useful in processing certain types of material. For example, in the processing of batts of non-oriented, loosely compacted fibrous material, it is desirable that the batt have a certain resilience, loft, density, final thickness and porosity characteristics for most effective results in their use as liners, filters, etc. These batts are usually supported on a foraminous conveyor and the drying medium applied thereto from only one direction. Thus, the air discharged through the nozzles is broken up by the baffles to effect an air flow causing a slight lofting of the batt as it passes through the drying chamber thereby avoiding harmful compression of the batt and resulting in a resilient and lofty characteristic. In the present instance, the baffle means comprises a pair of elongated generally rectangular plates 120 and 122 which are angularly disposed relative to one another and to the direction of flow of treating medium from the discharge nozzles 108. Preferably the plates 120 and 122 openly diverge toward the face of the conveyor on which the material being processed is supported, as illustrated in FIG. 9. The ends of the baffle plates are supported on end support brackets 130 which depend from the air box adjacent opposite ends of the outlet port 107.

As best illustrated in FIG. 9, the upper edge 121 and 123 of the plates 120 and 122 are spaced closely together and close to the outlet port. Further the edges 121 and 123 are spaced inwardly from the sides of the outlet port to divide the air discharged therethrough into three zones, zone X between the plates, zone Y outboard of the plate 120 and zone Z outboard of the plate 122.

The plates 120 and 122 are adapted for adjustment to vary selectively the angular relation of the plates to one another and to the direction of flow of the air discharged from the outlet port whereby the flow pattern of air in the vicinity of the material being treated may be varied to achieve the desired circulation for a given type of material being processed. To this end, each of the plates is pivotally mounted to the brackets 130 as at 140 adjacent the inner longitudinal edge thereof so that they may be swung in the direction indicated by the arrows, The plates are provided with arcuate slots 131 remote from the pivotal connection of the plates to the brackets to receive screw fasteners or the like so that the plates may be pivoted to a desired position and secured in that position by the fasteners. Thus, by the combination of the deflector 109 and the baffle plates 120 and 122 a uniform velocity of the air discharged through the discharge nozzle 108 is assured, and by reason of the plates 120 and 122 it has been found that the air diverted to the various zones creates a slight vacuum or suction which induces or draws a small amount of air up through the batt B in the zone X and hence, creates a slight lofting of the batt B. This induced circulation increases the drying rate and hence the drying efficiency of the dryer.

While particular embodiments of the present invention have been illustrated and described herein, it is not intended to limit the invention and changes and modifications may be made herein within the scope of the following claims.

We claim:

1. Apparatus for treating material comprising an elongated, generally enclosed housing, at least one treating compartment in said housing, means for conveying the material along a predetermined path through said treating compartment, treating medium conditioning means including a plurality of air boxes extending transversely of the direction of movement of said material along said path, each of said boxes having top and opposing side walls which converge from an entrance opening at one end of said box toward a closed end at the opposite end of said box, each box including a bottom wall having a plurality of discharge nozzles confronting the material whereby treating medium entering said box through said entrance opening is discharged through said nozzles, and a curved deflector plate adjacent the entrance end of said box operable to effect predetermined circulation of treating medium through said box in a manner providing uniform flow velocity through all the discharge nozzles and baffle means disposed adjacent said discharge nozzles in the path of flow of treating medium therefrom operable to effect a predetermined flow pattern of the treating medium in the vicinity of the material.

2. Apparatus as claimed in claim 1 wherein said baffle means comprises a pair of baffle plates which are angularly disposed relative to one another and to the direction of flow of the treating medium from said discharge nozzles operable to divide the treating medium discharge from each of said boxes into three zones.

3. Apparatus as claimed in claim 2 wherein said baffle plates openly diverge toward the material and including means for adjusting the angular relationship of the plates relative to one another.

4. Apparatus as claimed in claim 1 wherein said deflector plate is secured at one end to the top wall of the air box adjacent the entrance end thereof and the plate curves downwardly in the path of treating medium entering through the entrance end so that its opposite end is spaced downwardly from the top wall of the air box.

5. Apparatus as claimed in claim 4 wherein the opposite end of said deflector plate is movable relative to said air box so that the curvature of the deflector plate may be varied selectively.

6. Apparatus as claimed in claim 5 including means defining arcuate slots in the opposed side walls of said air box and fastening means engageable through said slots and the opposite end of said deflector plate whereby the curvature of the deflector plate may be selectively varied.

7. Apparatus as claimed in claim 1 including at least one conveyor for transporting the material along said path through said treating compartment and wherein said air boxes are disposed on opposite sides of said conveyor so that the treating medium is directed against opposite faces of said conveyor.

References Cited by the Examiner

UNITED STATES PATENTS

| | | | |
|---|---|---|---|
| 1,912,164 | 5/1933 | Seelig | 110—71 X |
| 2,012,115 | 8/1935 | Woodruff | 34—29 X |
| 2,101,974 | 12/1937 | Belcher | 34—159 |
| 2,109,704 | 3/1938 | Morrill | 34—159 X |
| 2,772,486 | 12/1956 | Johanson | 34—159 |
| 2,952,078 | 9/1960 | Litzler | 34—159 X |

DONLEY J. STOCKING, *Primary Examiner.*

FREDERICK L. MATTESON, JR., *Examiner.*

C. R. REMKE, *Assistant Examiner.*